United States Patent
Hagen

[11] 3,880,547
[45] Apr. 29, 1975

[54] RETARDING MEANS FOR GAS TURBINE DRIVEN VEHICLES

[75] Inventor: Hermann Hagen, Dachau, Germany

[73] Assignee: Motoren-Und Turbinen-Union Munchen GmbH, Munich, Germany

[22] Filed: Mar. 28, 1973

[21] Appl. No.: 345,515

[30] Foreign Application Priority Data
Mar. 28, 1972 Germany............... 2214972

[52] U.S. Cl............... 60/39.16 R; 415/36; 415/122
[51] Int. Cl. ............... F02c 1/06
[58] Field of Search........... 60/39.16 R; 415/30, 36, 415/122

[56] References Cited
UNITED STATES PATENTS

| | | | |
|---|---|---|---|
| 3,367,106 | 2/1968 | Robinson | 60/39.16 R |
| 3,533,493 | 10/1970 | Braun | 60/39.16 R |
| 3,598,211 | 8/1971 | Fergle | 60/39.16 R |
| 3,688,605 | 9/1972 | Amann et al. | 60/39.16 R |
| 3,744,241 | 7/1973 | Muller et al. | 60/39.16 R |
| 3,749,048 | 7/1973 | Jones et al. | 60/39.16 R |
| 3,771,916 | 11/1973 | Flanigan et al. | 60/39.16 R |

Primary Examiner—C. J. Husar
Attorney, Agent, or Firm—Craig & Antonelli

[57] ABSTRACT

A braking installation for a vehicle driven by a gas turbine engine of the type having a freely rotatable power turbine which is supplied with motive gases by a mechanically independent gas generator. The braking installation includes a transmission arrangement between a power turbine shaft and an output shaft which is attached to a change-speed gear for the vehicle or to an axle drive. The transmission includes a first set of gears for drivingly interconnecting the power turbine shaft and output shaft for normal driving of the vehicle and a second set of gears for reversing the relative rotation of the power turbine shaft and the output shaft so as to effect a braking mode of operation due to the deceleration and, eventually, reversal of rotational direction of the power turbine shaft. The respective first and second sets of gears are selectively engaged by way of hydrodynamic couplings. These hydrodynamic couplings may be arranged on the high speed power turbine shaft, or in alternative embodiments, may be arranged on the relatively lower speed output shaft. The gear attached to the output shaft for transmitting the reverse braking driving connection is smaller than the normal driving gear so as to simplify the overall construction and so as to optimize the relative gear reduction ratios for normal driving and for reverse speed braking operation.

31 Claims, 11 Drawing Figures

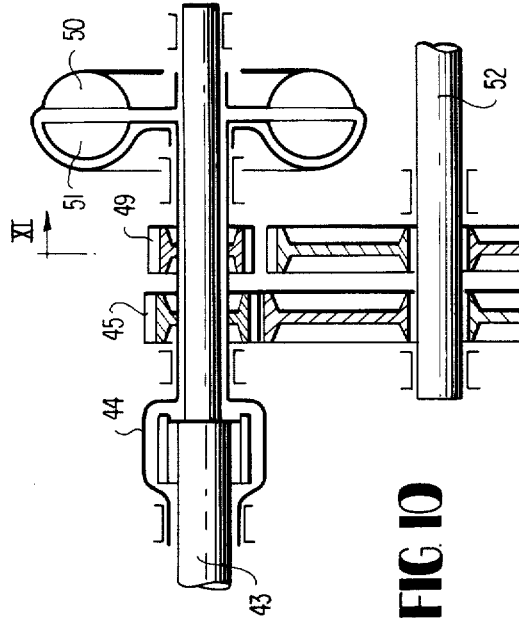
FIG. 7
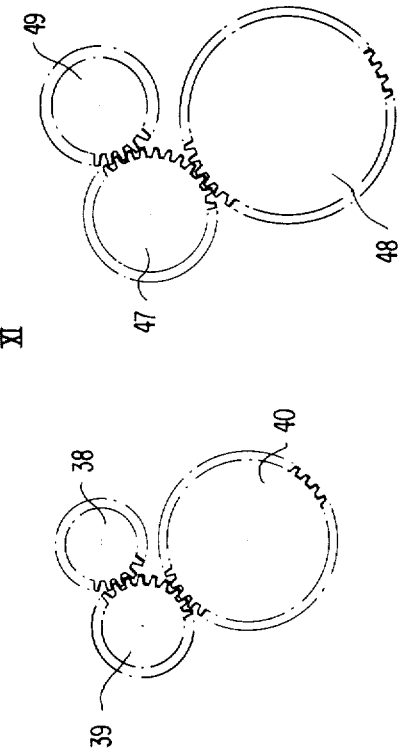
FIG. 10
FIG. 8
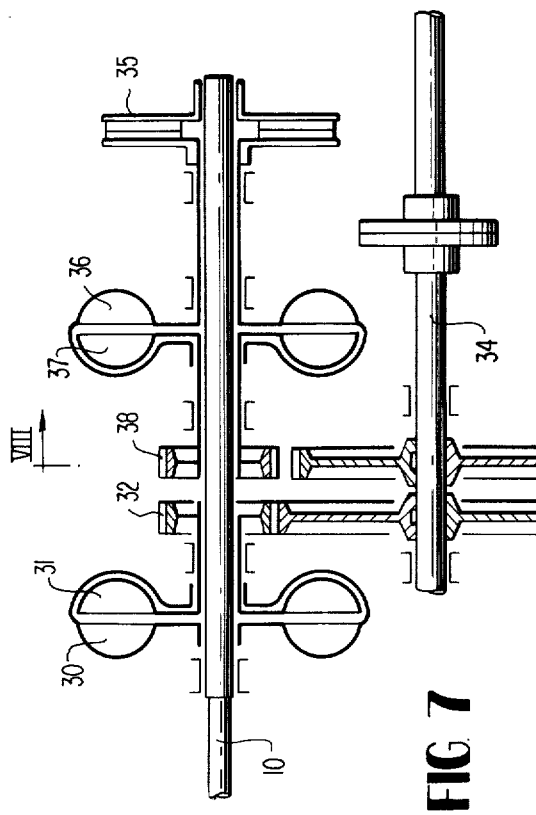
FIG. 9
FIG. 11
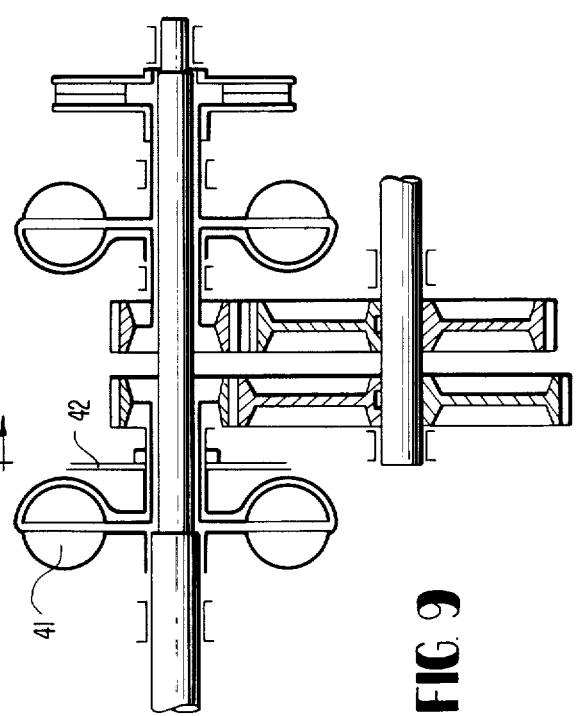

RETARDING MEANS FOR GAS TURBINE DRIVEN VEHICLES

BACKGROUND AND SUMMARY OF THE INVENTION

This invention relates to a retarding or braking installation for a vehicle propelled by a propulsion unit of the type including a gas generator, a power turbine which is mechanically independent of the gas generator, and optionally a turbine speed reducer followed by a change-speed gearbox.

The majority of conventional vehicular gas turbine engines provide propulsion through a power turbine which is mechanically independent of the actual gas turbine or gas generator which simply supplies it with motive gas. That is, the power turbine rotates independently of the gas generator turbine and compressor. It has been contemplated to provide a variable-pitch guide apparatus ahead of this power turbine to promote the service performance of the engine and especially the power turbine and to economize fuel at part load. This arrangement enables the vehicular gas turbine engine to absorb a notable amount of brake energy at reduced gas generator speed and with the power turbine rapidly revolving. The power turbine is also capable to provide brake effort, though limited in amount, even in the absence of a variable-pitch guide apparatus.

The brake effort gained by the above-discussed provisions is often barely if at all sufficient. Where such vehicular gas turbines are used, it is therefore normally necessary to resort to additional brakes which are suitable for continuous application.

The present invention contemplates providing an apparatus or installation for substantially augmenting the brake effort at the power turbine without necessitating fundamental changes to the blading of the power turbine.

The present invention also specifically contemplates providing a retarding means arranged between the power turbine and the changespeed gearbox or axle drive of the vehicle, said retarding means having a reversing gear unit and one or more driver manipulated or automatic elements for the transmission of torque in one of the two senses of rotation. These elements are used to achieve braking effort by concurrently breaking or interrupting the normal torque connection between the power turbine and the change-speed gearbox or the axle drive and making a parallel torque connection through a reversing gear unit. This causes the axle drive to decelerate the normal rotational motion of the power turbine and ultimately reverse the rotation thereof such that the power turbine generates negative torque and the brake energy is largely dissipated in the form of heat in the flow of working medium through the power turbine.

In a further aspect, this invention contemplates providing that the retarding means includes an output shaft spaced from the turbine shaft, a normal speed reducer stage arranged between the two shafts and a reversing stage for braking arranged adjacent the normal reducer stage and having a reversing gear on a separate shaft for reversing the relative rotation of the turbine and output shafts as compared to the relative rotation with the normal reducer stage connected. Provided also are the above-mentioned manually manipulated or automatic elements to effect the transfer of torque between the reducer and reversing stages. In this arrangement the turbine speed reducer and the retarding or reversing means are conveniently accommodated in a common casing to economize cubage or space occupied and weight.

In a further aspect, the present invention contemplates providing hydrodynamic actuating couplings for each of the reducer and reversing stages for alternately disengaging and engaging the torque transfer elements of the respective reducer and reversing stages. In the accelerating mode of operation of the vehicle, these hydrodynamic couplings make for smooth starting by allowing much slip especially in the speed range where, with a positive coupling, the turbine would have to dwell unduly long in an unfavorable speed range. They also provide the extra benefit of infinitely and widely variable torque transfer by changes in the oil content in the couplings. A salient feature of such a hydrodynamic coupling, however, is that is smoothly and with virtually no wear spans the drastic difference in rotational speed and direction of rotation that is bound to occur between the power turbine and the reversing gear unit early in deceleration, and that it so enables the power turbine to be slowed down from its positive rotation and caused to revolve in the reverse sense.

In a further aspect, the present invention contemplates substituting a free-wheeling clutch for one of the two actuating couplings of the justdescried arrangement. While this substitution relinquishes the benefit of smooth starting in acceleration, it nevertheless saves the cost of one of the fluid couplings.

In a further aspect, the present invention contemplates combining the actuation of the retarding means with the adjustment of the guide apparatus of the power turbine. This will permit the braking action to be accentuated or mitigated within a certain range as may be desirable at roughly consistent vehicle speeds on long downgrades.

In a further aspect, this invention contemplates providing that the fluid couplings are bypassed or disengaged by mechanical clutches to minimize power losses. In this arrangement a fluid coupling in the power path of the transmission may serve to continuously transmit the continuous accelerating torque, where a certain amount of slip is bound to occur. The continuous loss of power by slip can then be avoided by engaging, when the turbine in the coupling has sufficiently run up to the speed of the impeller, an additional mechanical clutch for transmitting torque without slip from then on. While in the braking mode the losses occurring in the hydrodynamic couplings do not play the same important part as during acceleration, even a small rise in vehicle speed, as perhaps on descents, when coupled with a rise in the temperature of the coupling fluid, should still best be avoided. It can be readily appreciated that these clutches will always have to be engaged or disengaged with their associated hydraulic couplings in such a manner as not to unduly interfere with the smooth speed changes transferred by the hydrodynamic couplings.

In a further apsect, the present invention contemplates providing that the gear ratios for normal acceleration on the one hand and braking service on the other are different. In a preferred arrangement of this invention, the different gear ratios are obtained by making the brake gear on the output shaft smaller than the normal drive gear on the output shaft such that the brake gear is spaced from the pinion on the turbine shaft. This arrangement is advantageous in that the use of equally sized pinions for like gear ratios in both the normal and the braking modes would be economically undesirable because more than two shafts would be required to accommodate the gearing, because with an arrangement having only two shafts and using the same gear module the output gear would in the decelerating mode mesh not only with the reversing gear but also with the pinion, which would make it incapable to serve its intended function. The relatively reduced transmission ratio between output speed and turbine speed because of the unequal gear size on the output shaft offers the additional advantage that when the reversal is made to the breaking mode the then reversed turbine speed will be prevented from coming too close to its maximum working speed even when the vehicle speed remains undiminished.

In a further aspect, the present invention contemplates providing a speed governor or limiter for automatically actuating the retarding means when the maximum allowable power turbine speed is exceeded. This precautionary feature averts mechanical damage to the turbine as a result of overspeed. In this arrangement, the reduction ratio in the reversing stage, being lower than the normal turbine speed reducer ratio, is an advantage in that it prevents the power turbine, after the speed limiter has responded, from being accelerated in the reverse sense until it again reaches maximum speed when the vehicle has not yet reduced speed at that time.

In a further aspect, this invention contemplates providing a change-speed gearbox without a reverse gear arranged between the retarder and the axle drive for the vehicle. This change-speed gearbox without reverse gear has an advantage over normal change-speed gearboxes in the simplicity of its mechanical design which makes it smaller, less costly and lighter in weight. This simplification is achieved in that the retarder is suitable not only for decelerating but also for reversing the motion without the aid of a reverse motion gear.

In a further aspect, the present invention contemplates arranging the hydraulic couplings preferably at the turbine end of the engine where the torque is still low and they can therefore be held small and lightweight.

In a further aspect, the present invention contemplates a preferred embodiment with the hydraulic couplings arranged on the output shaft. Inasmuch as the order of speed of this shaft is lower than that of the turbine shaft by approximately the tenth power due to the gear reduction, provisions to prevent vibrations, as by balancing, are simplified and the use of clutches to accompany hydraulic couplings is likewise feasible.

In a still further aspect, the present invention contemplates providing means for enabling the driver or an automechanism to actuate the retarder briefly during an upshift in the change-speed gear so as to prevent the jerk in shifting. Similarly, the jerk in downshifting can likewise be prevented simply by disengaging the coupling for normal acceleration.

The above-mentioned and further objects, features and advantages of the present invention will become more apparent from the following description when taken in connection with the accompanying drawings, which show, for purposes of illustration only, several embodiments in accordance with the present invention.

BRIEF DESCRIPTION OF THE DRAWINGS

FIG. 6 is a schematic view of the reversing gear arrangement of the transmission arrangement shown in FIG. 1;

FIG. 7 is a longitudinal schematic partial sectional view illustrating a second embodiment of a transmission arrangement constructed in accordance with the present invention;

FIG. 8 is a schematic view of the reversing gear arrangement of the transmission arrangement shown in FIG. 7;

FIG. 9 is a longitudinal schematic partial sectional view illustrating a further embodiment of a transmission arrangement constructed in accordance with the present invention;

FIG. 10 is a longitudinal schematic partial sectional view illustrating a further embodiment of a transmission arrangement constructed in accordance with the present invention; and FIG. 11 is a schematic view illustrating the reversing gear arrangement of the transmission arrangement shown in FIG. 10.

DETAILED DESCRIPTION OF THE DRAWINGS

Figure 1:
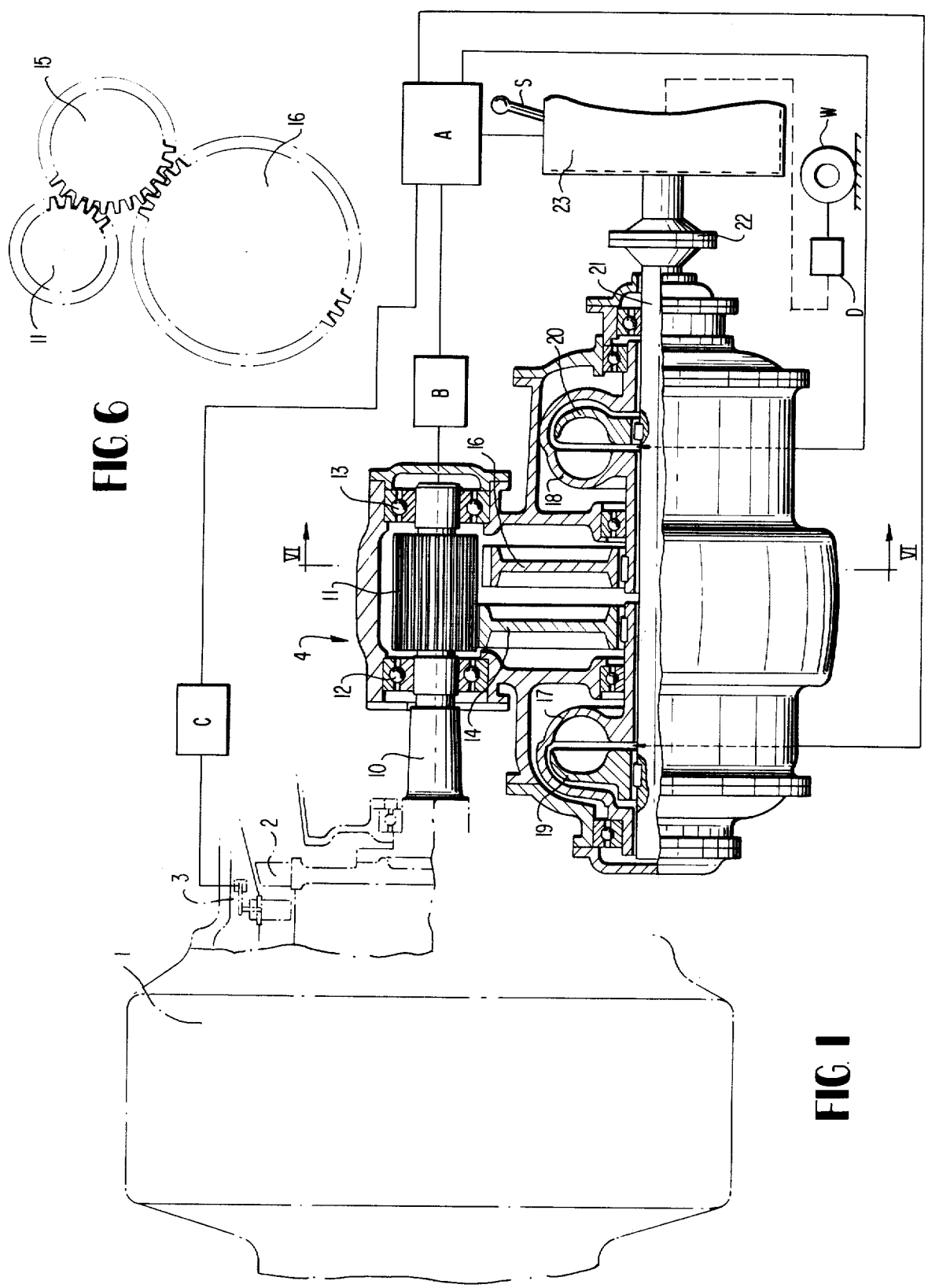
FIG. 1 is a longitudinal schematic partial sectional view illustrating a vehicular gas turbine and transmission arrangement constructed in accordance with a first embodiment of the present invention.

A gas turbine engine cooperating with transmission means including retarding or reversing means arranged in accordance with this invention is shown in FIGS. 1 and 6. The turbine engine includes a gas generator 1 and a power turbine 2 downstream of the gas generator 1. The gas generator may be of various types, such as a constant pressure gas turbine either having or not having a heat exchanger, or an intermittent pressure gas turbine. The power turbine 2 operates on motive gas supplied by the gas generator and normally in conjunction with a variable-pitch guide apparatus 3. The drive forces from the power turbine 2 are transmitted to driven wheels W of a vehicle through a turbine speed reducer 4 and change-speed gearbox 23 which is coupled and combined with reducer 4. In accordance with this invention the turbine speed reducer or the change-speed gearbox is provided with a means for operationally reversing the rotation of turbine shaft 10 connected to the power turbine for effectively decelerating the vehicle. Indicated in FIG. 1 is an arrangement having hydrodynamic or hydraulic couplings which will be described more fully elsewhere herein.

Figure 2:
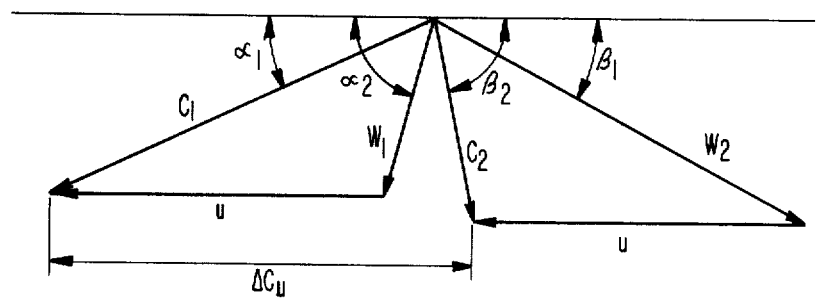
FIG. 2 is a diagram illustrating the flow velocities in a power turbine of the type illustrated in FIG. 1 at full load.
Figure 3:
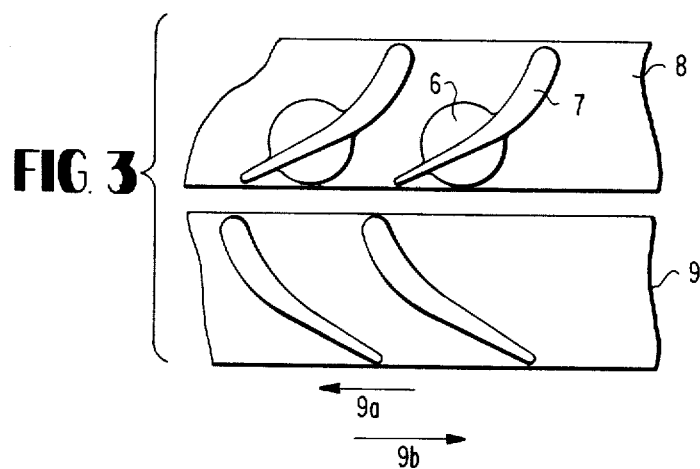
FIG. 3 illustrates blading details of a power turbine constructed in accordance with the present invention.

FIG. 2 is a flow velocity diagram of a single-stage power turbine which is here used by way of example. The absolute velocities at the inlet and the outlet of the rotor are indicated by $C_1$ and $C_2$, the relative velocities by $W_1$, $W_2$, and the peripheral velocities by U. The difference in peripheral components $\Delta C_t$ shows the impulse $I = M \Delta C_t$ imparted to the circumference of the rotor, where M is the mass flow. The blading used in this arrangement is shown in FIG. 3 which provides sectional views of the variable-pitch guide apparatus 8 (corresponding to generally depicted guide apparatus 3 in FIG. 1) and the rotor 9, (corresponding to generally depicted power turbine or rotor 2 of FIG. 1), where 9a is the normal and 9b the decelerating direction of rotation. Shown also are the turntables 6 which connect to the variable stator vanes 7 of the guide apparatus.

Figure 4:
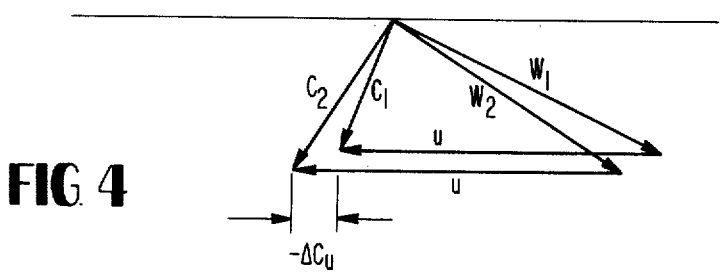
FIG. 4 is a diagram illustrating the flow velocities in a power turbine during deceleration at reduced gas generator speed, where the turbine guide apparatus is in its open position and without turbine shaft reversal.

When the gas generator speed is reduced and the gas flow with it, the axial velocity component is reduced. If the speed and the circumferential or peripheral velocity of the rotor with it is maintained, $\Delta C_t$ is bound to drop heavily and may even take a negative sign when the angle $\alpha_1$ of the guide apparatus is varied, i.e. augmented, while $\beta_1$, given by the angle of rotor flow, remains virtually unchanged. This results in the flow velocities charted in FIG. 4 which demonstrates the existence of a negative impulse $(-\Delta C_t)$ which comes to bear as a retarding moment in the live wheels of the vehicle.

Figure 5:
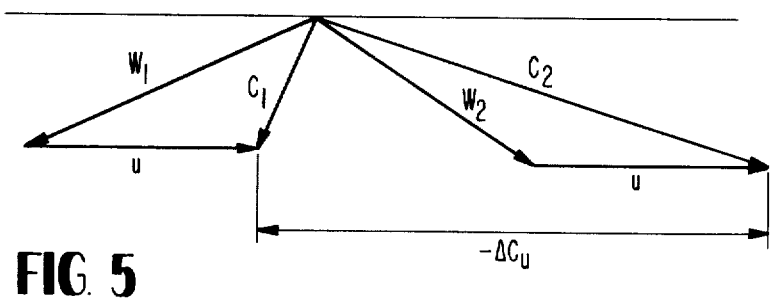
FIG. 5 is a diagram and illustrates the flow velocities in the power turbine during deceleration by means of a transmission arrangement including retarding or reversing means in accordance with the present invention (gas generator speed reduced, variable guide apparatus in its open position)

This negative impulse can be augmented according to the present invention by reversing the direction of the peripheral or circumferential velocity. This is shown in FIG. 5. The flow is now supplied with a great amount of energy. This becomes apparent from the negative sign of $\Delta C_t$ and also from the rise in absolute velocity from $C_1$ to $C_2$. This simplified view does not allow for the separation of the flow from the rotor contours, which may have the effect of slightly varying the flow angle $\beta_2$ of the relative velocity from the blade exit angle intended by design. This will then cause a certain degradation in the brake effort. This effort is enhanced when the angle $\alpha_1$ of the variable guide apparatus is narrowed to increase $C_1$.

The reversal of rotation of the power turbine that is needed to augment the braking effort according to the present invention can be effected by means of a reversing transmission, examples of which are shown in FIGS. 1 and 6 through 11.

FIG. 1 illustrates in detail an arrangement comprising a gas generator, power turbine, and a transmission constructed in accordance with this invention which includes a retarder or power turbine reversing installation.

The power turbine 2 drives a shaft 10 at the end of which is supported a pinion 11 in bearings 12 and 13. The pinion 11 meshes directly with a gear 14 and with a reversing gear 15 (FIG. 6) which is arranged in parallel with the gear 14 and is shown in FIG. 6. A gear 16 is coplanar and meshes with the reversing gear 15 and rotates about the same axis as the gear 14. The gear 16 is somewhat smaller than the gear 14 to prevent direct meshing with the pinion. This has the concurrent effect of reducing, when the rotation is reversed, the gear ratio from that in the normal direction of rotation, and affords further advantages that are described elsewhere herein.

The gears 14 and 16 are each drivingly connected to the respective pump impellers 17 and 18 of two hydraulic or hydrodynamic couplings which are selectively filled with coupling fluid and emptied. Gear 14 continuously drives impeller 17 in one direction and gear 16 continuously drives impeller 18 in the opposite direction. The turbine runners 19 and 20 of the two couplings are fixedly connected to an output shaft 21 which is drivingly connected to a change-speed gearbox 23 through a flanged coupling 22.

When the coupling 17 is filled and the coupling 18 empty, the direction of rotation will be, in this example, for normal forward drive. During braking, a transmission control device schematically depicted at A is used to empty the coupling 17 and fill the coupling 18 to reverse the rotation. To prevent jerks during braking, means are provided in device A to control the filling and emptying cycles. Since filling and emptying means of known construction can be used to fill and empty these hydrodynamic couplings, details of such filling and emptying means are not included herein.

FIG. 1 also schematically depicts a speed limiter B which includes means for measuring the speed of power turbine shaft 10 and means for automatically actuating transmission control device A to initiate a braking mode of operation in response to power turbine shaft speeds in excess of a predetermined amount. Since, given the present disclosure, one skilled in the art could construct such a speed limiter arrangement with known specific mechanism, further details of same are not included herein.

Also, schematically depicted in FIG. 1 is a guide apparatus control device C which is operatively interconnected with transmission control device A to adjust the guide apparatus 3 during braking sequences of operation. Since, given the present disclosure, one skilled in the art could also construct such a guide apparatus control device with known specific mechanism, further details of same are not included herein. For example, device C could include means for detecting deceleration and reversal of shaft 10 and turbine 2 and means for adjusting the guide apparatus accordingly to optimize the engine braking mode of operation.

Control device A is also schematically depicted as operatively connected to gearbox 23 to facilitate actuation of the braking mode in response to the shifting sequence of gearbox 23 so as to reduce jerks during shifting of gears in gearbox 23. S schematically depicts a gear selector means operatively connected to gearbox 23. In a preferred arrangement, control device A includes means for briefly opening a drain valve of the hydraulic coupling 17, 19 during downshifts of gearbox 23 so as to at least partially disengage the normal drive coupling to prevent the shifting jerk. D schematically depicts a vehicle axle drive connected to vehicle wheels W and output shaft 21/gearbox 23.

Although devices A, B & C schematically depicted in FIG. 1 and described above are not included in the illustration of the other embodiments of FIGS. 7 – 11, it is to be understood that generally similar corresponding devices are to be used to control the operation of these other embodiments.

The transmission embodiment shown in FIG. 7 is generally similar to that in FIG. 1. While in FIG. 1, the actuating elements in the shape of hydraulic couplings are arranged on the low-speed output side, FIG. 7 shows similarly arranged hydraulic couplings, but here disposed on the high-speed shaft 10 of the power turbine. The power turbine shaft 10 is driven by the power turbine and is connected directly to a hydraulic coupling 30 which has provisions for filling and emptying similar to those schematically depicted in FIG. 1. The secondary portion 31 of this coupling 30 drives to a gear 32 which is in continuous engagement with an output gear 33. This gear 33 is fixedly connected to an output shaft 34. A clutch 35, which serves to alleviate losses with an empty coupling and may optionally be eliminated, drives the pump impeller of a second hydraulic coupling 36 which is empty when the coupling 30 is engaged (filled). The rotor 37 of the coupling 36 connects to the gears 38, 39 and 40 (see also FIG. 8) to effect the reversal of rotation when the coupling 30 is disengaged and the couplings 36 and 35 engaged. The gear 40 is fixedly connected to the output shaft 34. A transmission control device similar to the schematically depicted device A of the FIG. 1 embodiment controls the filling and emptying of the couplings. Further clutch control means of conventional construction clutch 35 to connect impeller 36 with shaft 10 during filling of coupling 36, 37.

A still further alternative preferred embodiment is shown in FIG. 9. In order to prevent the slippage inherent in hydrodynamic couplings, this arrangement utilizes a clutch 42 to by-pass the coupling 41. Other than this clutch 42, this figure of embodiment is similar to the FIG. 7 embodiment.

FIGS. 10 and 11 illustrate a further embodiment with a much simplified arrangement, where a power turbine shaft 43 drives to a free-wheeling clutch 44 which impels the gear 45 in the normal drive direction when the hydraulic coupling 50 is empty. A gear 46 meshes directly with and drives an output shaft 52 which takes the drive to the change-speed gearbox and the rear axle drive, which are not shown in this figure (see FIG. 1 for geargox, etc.). In mesh with the gear 49 are also the gears 47 (reversing gear) and 48, which serve to effect the reversal of rotation. The gear 49 is fixedly connected to the turbine runner 51 driven by the pump impeller 50 of the hydraulic coupling. This gear is set in rotation when the coupling is filled. The rotation of the power turbine is then reversed and power is taken from the working side 52, where also the torque of the power turbine is reversed. To alleviate losses when the empty coupling rotates in air during normal operation, the hydrodynamic coupling can be bypassed by means of a clutch or replaced similarly as shown in FIGS. 7 and 9.

While I have shown and described only several embodiments in accordance with the present invention, it is understood that the same is not limited thereto but also contemplates numerous changes and modifications as would be known to those skilled in the art given the present disclosure of the invention, and I, therefore, did not wish to be limited to the details shown and described herein only schematically but intend to cover all such changes and modifications.

I claim:

1. An installation comprising:
rotatable power turbine means,
power turbine shaft means rotatable with said power turbine means,
motive fluid generator means for supplying a motive fluid to rotatably drive said power turbine means,
output shaft means, first selectively engageable transmissions means for transmitting rotational movement and torque between said power turbine shaft means and output shaft means with the relative direction of rotation of said power turbine shaft means and output means corresponding to transfer of driving forces from said power turbine shaft means to said output shaft means, second selectively engageable transmission means for transmitting rotational movement and torque between said power turbine shaft means and output means with the relative direction of rotation of said power turbine shaft means and output shaft means being opposite of the relative direction of rotation transmitted by said first transmission means and corresponding to transfer of braking forces from said power turbine shaft means to said output shaft means, and transmission control means for selectively engaging one of said first and second transmission means while disengaging the other of said first and second transmission means whereby said power turbine means can be selectively used to apply one of driving and braking forces to said output shaft.

2. An installation according to claim 1, wherein said power turbine means rotates independently of gas generator turbine and compressor means of the motive fluid generator means.

3. An installation according to claim 2, wherein said motive fluid generator means is a gas generator of a gas turbine engine.

4. An installation according to claim 3, wherein said output shaft is drivingly connectible to one of a vehicle axle drive and a vehicle change-speed gearbox, and wherein said first and second transmission means and said output shaft means are interposable in the drive chain between said power turbine shaft means and said one of a vehicle axle drive and a vehicle change-speed gearbox.

5. An installation according to claim 4, wherein said first transmission means includes a first gear rotatable about the axis of said power turbine shaft means and a second gear surrounding said output shaft means and in meshing engagement with said first gear, and wherein said second transmission means includes a third gear surrounding said output shaft means and a fourth gear in intermeshing engagement with both a gear rotatably mounted on said power turbine shaft means and said third gear, said fourth gear being rotatably mounted on a shaft spaced from both of said power turbine shaft means and output shaft means.

6. An installation according to claim 5, wherein each of said first and second transmission means include a hydrodynamic actuating coupling, and wherein said transmission control means includes means for filling and emptying said hydrodynamic couplings to effectively engage and disengage said first and second transmission means.

7. An installation according to claim 4, wherein each of said firsts and second transmission means include a hydrodynamic actuating coupling, and wherein said transmission control means includes means for filling and emptying said hydrodynamic couplings to effectively engage and disengage said first and second transmission means.

8. An installation according to claim 6, wherein each of said hydrodynamic couplings are mounted on said output shaft means.

9. An installation according to claim 6, wherein each of said hydrodynamic couplings are mounted on said power turbine shaft means.

10. An installation according to claim 5, wherein said first transmission means includes a first hydrodynamic coupling having a turbine runner fixed to said output shaft means and a pump impeller rotatable with said second gear means, and wherein said second transmission means includes a second hydrodynamic coupling having a turbine runner fixed to said output shaft means and a pump impeller rotatable with said third gear, said transmission control means including means for emptying said second hydrodynamic coupling and filling said first hydrodynamic coupling to establish a normal driving connection between said power turbine shaft means and said output shaft means by way of said first transmission means, and means for filling said second hydrodynamic coupling and emptying said first hydrodynamic coupling to establish a braking connection between said power turbine shaft means and said output shaft means by way of said second transmission means.

11. An installation according to claim 5, wherein said first transmission means includes a first hydrodynamic coupling having a turbine runner fixed to said first gear and a pump impeller rotatable with said power turbine shaft means, and wherein said second transmission means includes a fifth gear which is rotatable about said axis of the power turbine shaft means, and a second hydrodynamic coupling having a turbine runner fixed to said fifth gear and a pump impeller rotatable with said power shaft means, said fifth gear being the gear in intermeshing engagement with said fourth gear, said transmission control means including means for emptying said second hydrodynamic coupling and filling said first hydrodynamic coupling to establish a normal driving connection between said power turbine shaft means and said output shaft means by way of said first transmission means, and means for filling said second hydrodynamic coupling and emptying said first hydrodynamic coupling to establish a braking connection between said power turbine shaft means and said output shaft means by way of said second transmission means.

12. An installation according to claim 11, wherein said second transmission means further includes a selectively engageable mechanical clutch for selectively drivingly connecting said power turbine shaft means to the pump impeller of the second hydrodynamic coupling.

13. An installation according to claim 11, wherein said first transmission means further includes a selectively engageable mechanical clutch for selectively drivingly connecting said first gear to the pump impeller of said first hydrodynamic coupling whereby with an engaged mechanical clutch said first gear is driven by said power turbine shaft means in bypassing relationship to said first hydrodynamic coupling.

14. An installation according to claim 13, wherein said second transmission means further includes a selectively engageable mechanical clutch for selectively drivingly connected said power turbine shaft means to the pump impeller of the second hydrodynamic coupling.

15. An installation according to claim 5, wherein said first transmission means includes a free wheeling mechanical clutch for selectively drivingly connecting said first gear with said power turbine shaft means, and wherein said second transmission means includes a fifth gear which is rotatable about said axis of the power turbine shaft means and a hydrodynamic coupling having a turbine runner fixed to said fifth gear and a pump impeller rotatable with said power turbine shaft means.

16. An installation according to claim 15, wherein said transmission control means includes means for filling said hydrodynamic coupling to establish a braking connection between said power turbine shaft means and said output shaft means by way of said second transmission means.

17. An installation according to claim 7, wherein selectively engageable mechanical clutch means are arranged in bypassing relationship with respect to at least one of said hydrodynamic couplings for establishing a drive connection in at least one of said transmission means independently of the associated hydrodynamic coupling, whereby power losses in said associated hydrodynamic coupling are alleviated.

18. An installation according to claim 4, wherein said first transmission means and said second transmission means includes means for transmitting respective different relative absolute rotational velocities.

19. An installation according to claim 18, wherein the first transmission means includes means for transmitting greater absolute rotational speed reduction between the power turbine shaft means and the output shaft means than does the second transmission means.

20. An installation according to claim 4, further comprising speed limiter means for disengaging said first transmission means and engaging said second transmission means in response to power turbine speed in excess of a predetermined value.

21. An installation according to claim 4, wherein said output shaft means is connected as an input shaft to a change-speed gearbox which has a gearbox output shaft drivingly connected to vehicle wheels.

22. An installation according to claim 21, wherein said change-speed gearbox includes means for changing speeds in only one rotational direction of the output shaft of the gearbox.

23. An installation according to claim 21, further comprising gear selector lever means and additional actuating means to briefly decelerate the power turbine means during shifting operations to prevent shifting jerk.

24. An installation according to claim 23, wherein said additional actuating means includes means for disengaging said first transmission means for decelerating the power turbine means.

25. An installation according to claim 24, wherein said additional actuating means includes means for automatically operating said additional actuating means in response to shifting operations.

26. An installation according to claim 24, wherein said additional actuating means includes manually operable means.

27. An installation according to claim 7, wherein said output shaft means is connected as an input shaft to a change-speed gearbox which has a gearbox output shaft drivingly connected to vehicle wheels.

28. An installation according to claim 27, wherein gear selector lever means and additional actuating means are provided to briefly decelerate the power turbine means during shifting operations to prevent shifting jerk.

29. An installation according to claim 28, wherein said additional actuating means includes means operable in response to movement of said gear selector lever means to briefly open a drain valve of said first hydrodynamic coupling so as to at least partially disengage the drive connection established by said first hydrodynamic coupling.

30. An installation according to claim 5, wherein said fourth gear is in continuous meshing engagement with said first and third gears, said third gear being spaced out of meshing engagement with said first gear.

31. An installation according to claim 10, wherein said fourth gear is in continuous meshing engagement with said first and third gears, said third gear being spaced out of meshing engagement with said first gear.

* * * * *